(12) United States Patent
Samudrala et al.

(10) Patent No.: US 10,190,571 B2
(45) Date of Patent: Jan. 29, 2019

(54) RING INSERT FOR A WIND TURBINE ROTOR BLADE

(71) Applicant: General Electric Company, Schenectady, NY (US)

(72) Inventors: Srikanth Samudrala, Bangalore (IN); Biju Nanukuttan, Bangalore (IN); Dhanesh Chandrashekar Pathuvoth, Bangalore (IN); Willem Jan Bakhuis, Nijverdal (NL)

(73) Assignee: General Electric Company, Schenectady, NY (US)

( * ) Notice: Subject to any disclaimer, the term of this patent is extended or adjusted under 35 U.S.C. 154(b) by 207 days.

(21) Appl. No.: 14/788,982

(22) Filed: Jul. 1, 2015

(65) Prior Publication Data

US 2017/0002660 A1   Jan. 5, 2017

(51) Int. Cl.
  *F03D 1/06*   (2006.01)
(52) U.S. Cl.
  CPC ...... *F03D 1/0658* (2013.01); *F05B 2240/912* (2013.01); *Y02E 10/721* (2013.01); *Y02E 10/728* (2013.01)
(58) Field of Classification Search
  CPC ............................ F03D 1/0675; F05B 2240/30
  USPC ........................................................ 416/248
  See application file for complete search history.

(56) References Cited

U.S. PATENT DOCUMENTS

| | | | |
|---|---|---|---|
| 4,236,873 A | 12/1980 | Sherman et al. | |
| 4,915,590 A | 4/1990 | Eckland et al. | |
| 5,660,527 A | 8/1997 | Deering et al. | |
| 6,443,701 B1 | 9/2002 | Muhlbauer | |
| 7,163,378 B2 | 1/2007 | Kildegaard | |
| 7,517,194 B2 | 4/2009 | Doorenspleet et al. | |
| 7,530,168 B2 | 5/2009 | Sorensen et al. | |
| 7,966,726 B2 | 6/2011 | Schibsbye | |
| 7,993,103 B2 | 8/2011 | Cairo | |
| 8,025,485 B2 | 9/2011 | Jacobsen | |
| 8,066,490 B2 | 11/2011 | Babu et al. | |

(Continued)

FOREIGN PATENT DOCUMENTS

| | | |
|---|---|---|
| EP | 1 956 235 B1 | 10/2010 |
| EP | 2 283 231 B1 | 3/2012 |

(Continued)

*Primary Examiner* — David E Sosnowski
*Assistant Examiner* — Juan G Flores
(74) *Attorney, Agent, or Firm* — Dority & Manning, P.A.

(57) ABSTRACT

The present disclosure is directed to a rotor blade assembly for a wind turbine. The rotor blade assembly includes a rotor blade having a blade root section and a rigid ring insert. The rotor blade has pressure and suction sides extending between leading and trailing edges. The blade root section includes an end face configured to attach the rotor blade assembly to a hub. Further, the blade root section includes a span-wise end portion defined by inner and outer circumferential components separated by a radial gap. The radial gap includes a first laminate material embedded between the inner and outer circumferential components at a first span-wise depth and a second laminate material embedded between the inner and outer circumferential components at a second span-wise depth. Thus, the rigid ring insert is disposed in the radial gap and embedded between the first and second laminate materials.

16 Claims, 8 Drawing Sheets

(56) References Cited

U.S. PATENT DOCUMENTS

| | | |
|---|---|---|
| 8,105,040 B2 | 1/2012 | Vronsky et al. |
| 8,186,960 B2 | 5/2012 | Dawson et al. |
| 2008/0206059 A1 | 8/2008 | Hancock et al. |
| 2010/0084079 A1 | 4/2010 | Hayden et al. |
| 2010/0124474 A1 | 5/2010 | Jacobsen et al. |
| 2010/0290912 A1 | 11/2010 | Sorensen |
| 2011/0044817 A1 | 2/2011 | Bendel et al. |
| 2012/0207607 A1 | 8/2012 | Mironov |
| 2014/0119926 A1* | 5/2014 | Bussieres ............. F03D 1/0658 416/205 |
| 2014/0140853 A1* | 5/2014 | Feigl ..................... F03D 1/0658 416/222 |
| 2014/0234109 A1* | 8/2014 | Hayden ................ B29C 70/865 416/204 R |
| 2014/0356176 A1 | 12/2014 | Caruso |
| 2016/0053741 A1* | 2/2016 | Sabbadin ............. F03D 1/0658 416/230 |
| 2017/0045032 A1* | 2/2017 | Jacobsen .............. F03D 1/0658 |

FOREIGN PATENT DOCUMENTS

| | | |
|---|---|---|
| EP | 2 453 129 A1 | 5/2012 |
| GB | 2472460 | 2/2011 |
| JP | 2003293935 A | 10/2003 |
| WO | WO 2003/082551 A1 | 10/2003 |
| WO | WO 2006/070171 A1 | 7/2006 |
| WO | WO 2009/085041 A1 | 7/2009 |
| WO | WO 2010/149806 A1 | 12/2010 |
| WO | WO 2011/035548 A1 | 3/2011 |
| WO | WO 2012/038034 | 3/2012 |

\* cited by examiner

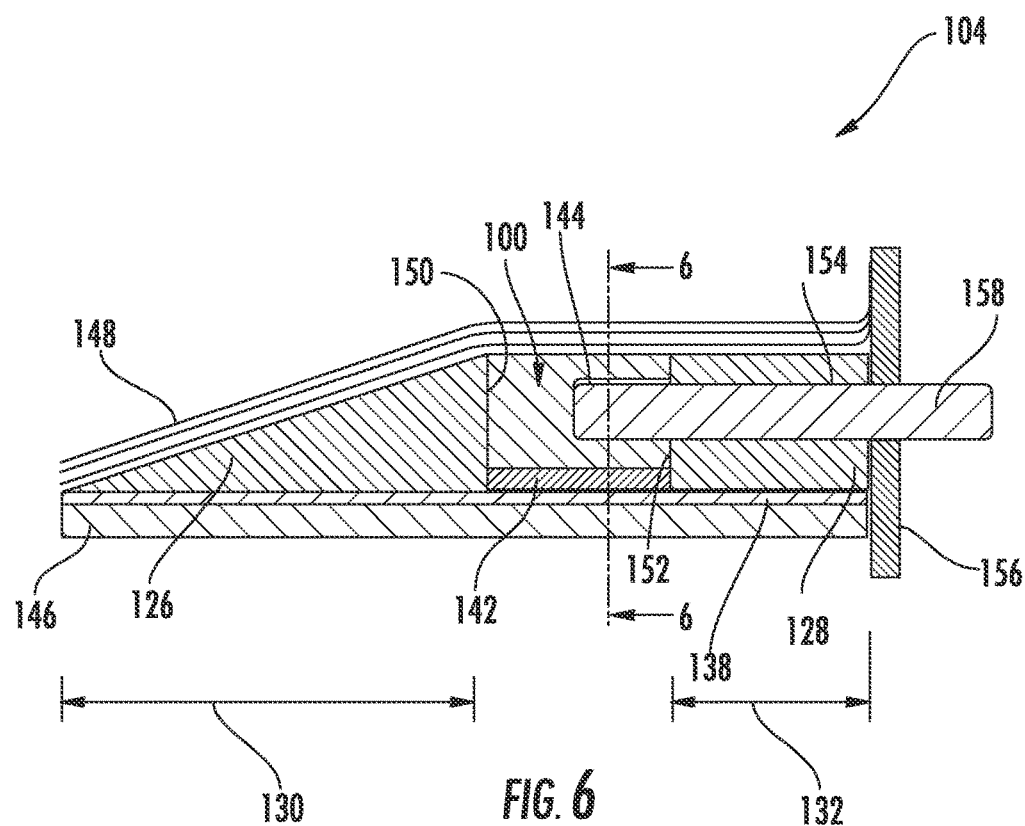
FIG. 6
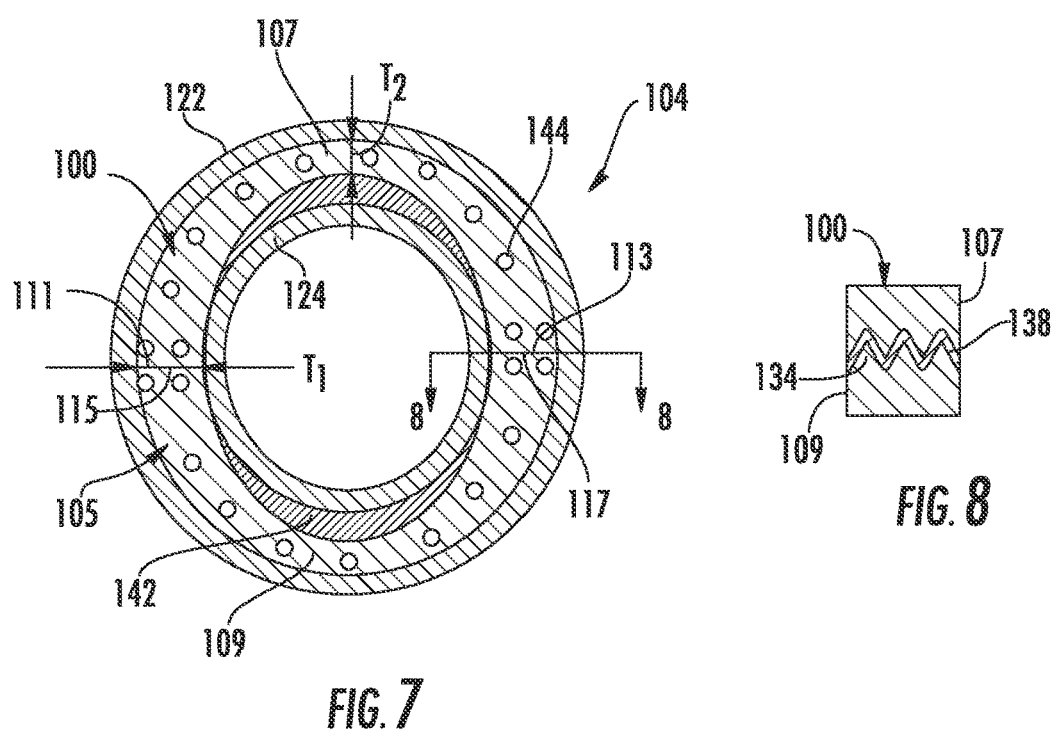
FIG. 7
FIG. 8

RING INSERT FOR A WIND TURBINE ROTOR BLADE

FIELD OF THE INVENTION

The present subject matter relates generally to wind turbines and, more particularly, to ring inserts for wind turbine rotor blades that provide improved blade root stiffness.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and a rotor. The rotor is coupled to the nacelle and includes a rotatable hub having one or more rotor blades. The rotor blades are connected to the hub by a blade root. The rotor blades capture kinetic energy from wind using known airfoil principles and convert the kinetic energy into mechanical energy through rotational energy to turn a shaft coupling the rotor blades to a gearbox, or if a gearbox is not used, directly to the generator. The generator then converts the mechanical energy to electrical energy that may be deployed to a utility grid.

The particular size of the rotor blades is a significant factor contributing to the overall capacity of the wind turbine. Specifically, increases in the length or span of a rotor blade may generally lead to an overall increase in the energy production of a wind turbine. Accordingly, efforts to increase the size of rotor blades aid in the continuing growth of wind turbine technology and the adoption of wind energy as an alternative and commercially competitive energy source. Such increases in rotor blade size, however, may impose increased loads on various wind turbine components. For example, larger rotor blades may experience increased stresses at the connection between the blade root and the hub, leading to challenging design constraints, both characterized by extreme events and fatigue life requirements.

The likelihood of structural failure due to fatigue at the rotor blade joint is typically increased by the presence of high stress concentration between the load bearing components, manufacturing defects, unexpected loading events or deterioration of the joint. Loss of preload can also occur in the bolted joint which is known to reduce fatigue life. To endure the load envelope specific to the rotor blade root, various methods and systems have been devised and implemented to improve the connection between the dissimilar materials intrinsic to the rotor blade components. For example, some systems consist of a blade root having a flange that is bolted to the hub. More specifically, the root flange may be bolted to the hub via a plurality of T-bolt connections. In such an embodiment, a plurality of root bolts are secured to the blade root by inserting the bolts into a plurality of corresponding barrel nuts configured perpendicularly in the blade root. Thus, the strength of the bolted connection may be increased as the number T-bolt connections increases. In further systems, steel inserts or rods may be bolted directly into the composite blade root to provide increased stiffness to the bolted connection. In still additional systems, low-cost, low-density foam may also be inserted between the bolts and inserts.

Not all such configurations, however, maximize load transfer between the composite and the metal materials, which may cause a variety of design problems such as high concentration factors, structural discontinuity, and ovalization issues due to the Brazier effect. The Brazier effect occurs when the blade root is subjected to bending and the longitudinal tension and compression (which resists the applied load) tends to flatten or ovalize the cross-section of the root. In addition, the number of root bolts that may be used to join the blade root to the hub is inherently limited to the number of barrel nuts that can be circumferentially spaced about the blade root.

Thus, there is a need for an improved rotor blade assembly suitable for securing the rotor blade to the hub of the wind turbine that provides enhanced root stiffness, thereby enabling further scaling of the wind turbine rotor blades.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rotor blade assembly for a wind turbine. The rotor blade assembly includes a rotor blade having a generally cylindrical blade root section, and a rigid ring insert configured within the blade root section. The rotor blade has a pressure side and a suction side extending between a leading edge and a trailing edge. The blade root section includes an end face configured to attach the rotor blade assembly to a hub. Further, the blade root section includes a span-wise end portion defined by an inner circumferential component and an outer circumferential component. The inner and outer circumferential components are separated by a radial gap. The radial gap includes a first laminate material embedded between the inner and outer circumferential components at a first span-wise depth and a second laminate material embedded between the inner and outer circumferential components at a second span-wise depth. Thus, the rigid ring insert is disposed in the radial gap and embedded between the first and second laminate materials.

In one embodiment, the ring insert includes one or more bolt holes configured to receive one or more blade bolts that are configured to secure the blade root section to a hub of the wind turbine. Thus, in certain embodiments, the one or more bolt holes, as well as the blade bolts, may be threaded.

In another embodiment, the ring insert may include a varying cross-section configured to account for varying edge-wise and/or flap-wise loads of the blade root section. In further embodiments, the ring insert may be constructed of a single segment or a plurality of segments. Thus, in certain embodiments, the plurality of segments may be joined together via one or more of the following: an interlocking joint, an interference fit, aligning features, adhesive, tape, one or more fasteners, or similar. More specifically, in particular embodiments, the ring insert may include a first segment and a second segment. In such an embodiment, the thickness of the first and second segments may vary between a first end and a second end thereof.

In additional embodiments, the end face of the blade root section may be connectable to a pitch bearing via the one or more blade bolts. Further, the pitch bearing may be configured operably between the rotor blade assembly and the hub.

In yet another embodiment, the rigid ring insert may be constructed of any suitable material configured to receive the blade bolts and retain a certain bolt pre-loading as well as providing increased stiffness to the blade root section. For example, in certain embodiments, the ring insert may be constructed of a metal or metal alloy, such as steel, or similar.

In still further embodiments, the blade root section may also include a foam material, such as a foam ring, configured adjacent to the ring insert between the first and second laminate materials. In addition, the ring insert may be further bonded between the first and second laminate materials via an adhesive.

In yet another aspect, the present disclosure is directed to a method for manufacturing a blade root section of a rotor blade of a wind turbine. The method includes placing an outer layer of laminate material in a shell mold. Another step includes placing a rigid ring insert into the shell mold adjacent to the outer layer of laminate material, wherein the ring insert includes one or more bolt holes configured to receive one or more blade bolts. The method also includes inserting a first composite material adjacent a first side of the ring insert and a second composite material adjacent an opposite side of the ring insert, wherein the second composite material includes corresponding bolt holes that align with the bolts holes of the ring insert. Still a further step includes placing an inner layer of laminate material in the shell mold. The method also includes infusing the ring insert between the outer and inner layers of laminate material such that the ring insert is embedded between the first and second composite materials.

In one embodiment, the method also includes positioning a structural component adjacent to and substantially perpendicular to the second composite material, and placing the inner layer of laminate material in the shell mold such that the inner layer is secured to the structural component. In certain embodiments, the structural component may include a metal plate configured to form a flat end face of the blade root. Further, in particular embodiments, the metal plate is configured to prevent resin from entering the shell mold.

In further embodiments, the method also includes placing one or more bolt components, or bolt place-holders, through the metal plate and into the aligned bolt holes of the ring insert before infusing the ring insert between the outer and inner layers of laminate material. In addition, the structural component may be used to position the one or more bolt components through the aligned bolt holes. Thus, the bolt component(s) are configured to prevent resin from blocking or clogging the aligned bolt holes during manufacturing. Accordingly, the method may also include removing the bolt components after infusing the ring insert between the outer and inner layers of laminate material.

In yet another embodiment, the method may include applying adhesive between the outer layer of laminate material and the ring insert. In addition, the method may also include providing a foam material, e.g. a foam ring, between the adhesive and the ring insert.

In further embodiments, the method may also include placing a plurality of segments of the ring insert into the shell mold adjacent to the outer layer of laminate material, and joining the plurality of segments together via one or more of the following: an interlocking joint, an interference fit, aligning features, adhesive, tape, one or more fasteners, or similar. In addition, the method may include placing a first segment of the ring insert and a second segment of the ring insert into the shell mold adjacent to the outer layer of laminate material, wherein a thickness of the first segment varies between a first end to a second end of the first segment and a thickness of the second segment varies between a first end to a second end of the second segment.

In yet another aspect, the present disclosure is directed to a wind turbine. The wind turbine includes a tower, a nacelle configured atop the tower, and a rotor coupled to the nacelle. The rotor includes a rotatable hub and at least one rotor blade assembly. The rotor blade assembly includes a rotor blade, a generally cylindrical blade root section, and a rigid ring insert. The rotor blade has a pressure side and a suction side extending between a leading edge and a trailing edge. The blade root section includes an end face configured to attach the rotor blade assembly to a hub. Further, the blade root section includes a span-wise end portion defined by an inner circumferential component and an outer circumferential component. The inner and outer circumferential components are separated by a radial gap. The radial gap includes a first laminate material embedded between the inner and outer circumferential components at a first span-wise depth and a second laminate material embedded between the inner and outer circumferential components at a second span-wise depth. Thus, the rigid ring insert is disposed in the radial gap and embedded between the first and second laminate materials. The rotor blade assembly may be further configured in accordance with any of the embodiments discussed above.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 6 illustrates a partial, cross-sectional view of one embodiment of a blade root section of a rotor blade during the manufacturing process according to the present disclosure;

FIG. 7 illustrates a top view along line 6-6 of the embodiment of FIG. 6;

FIG. 8 illustrates a cross-sectional view along line 8-8 of the embodiment of FIG. 7;

DETAILED DESCRIPTION OF THE INVENTION

Figure 1:
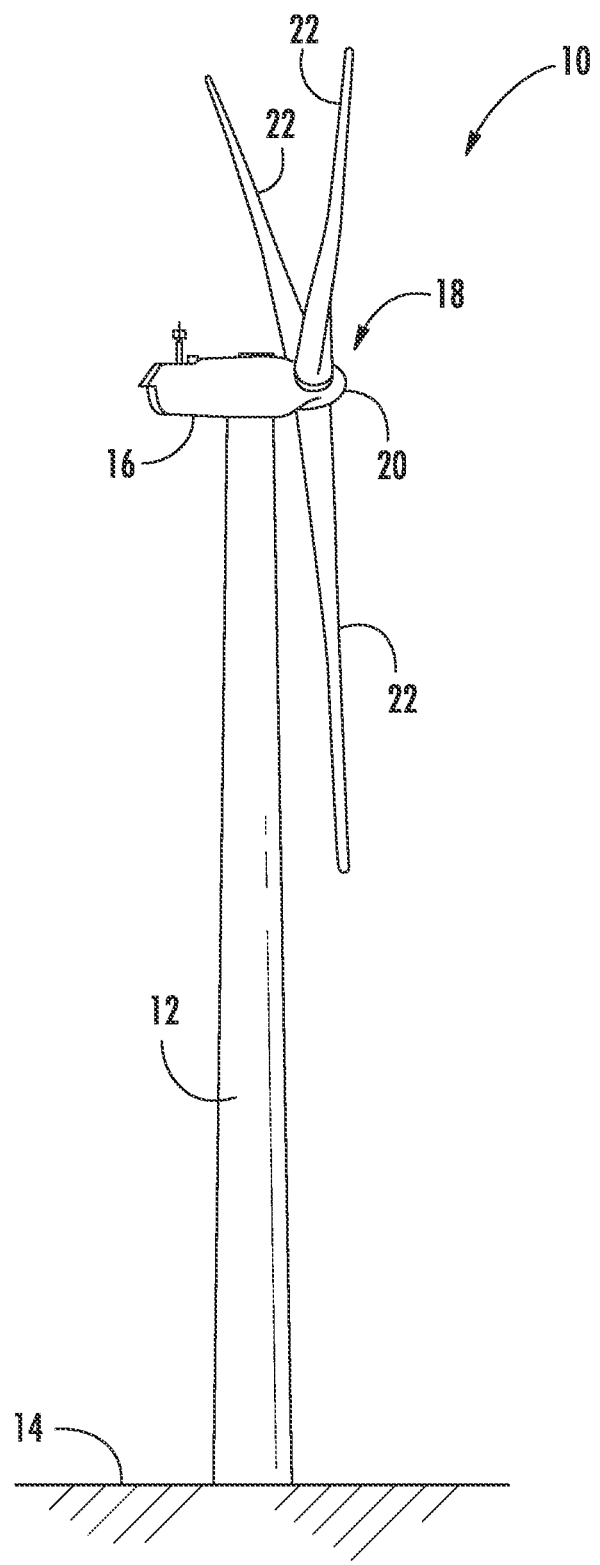
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present invention is directed to a rotor blade assembly for a wind turbine having a blade root section with a rigid ring insert configured therein that eliminates the need for conventional T-bolt connections. For example, the blade root section includes a span-wise end portion defined by an inner circumferential component and an outer circumferential component. The inner and outer circumferential components are separated by a radial gap. The radial gap includes a first laminate material embedded between the inner and outer circumferential components at a first span-wise depth and a second laminate material embedded between the inner and outer circumferential components at a second span-wise depth. Thus, the rigid ring insert is disposed in the radial gap and is embedded between the first and second laminate materials. In addition, the rigid ring insert includes one or more bolt holes configured to receive one or more blade bolts that secure the blade root section to a hub of the wind turbine.

The present disclosure provides many advantages not present in the prior art. For example, as rotor blades continue to increase in size, the rigid root insert allows for more blade bolts at the blade/hub joint, thereby providing a stronger connection. Further, the ring insert is less burdensome than individual barrel nuts required for each blade bolt. In addition, the rigid root insert provides improved root stiffness, thereby reducing pitch bearing deformation. Further, the blade root sections manufactured according to the present disclosure can be completed quickly and efficiently as compared to prior art methods. Moreover, the blade root section has an improved end face finish.

Referring to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

Figure 2:
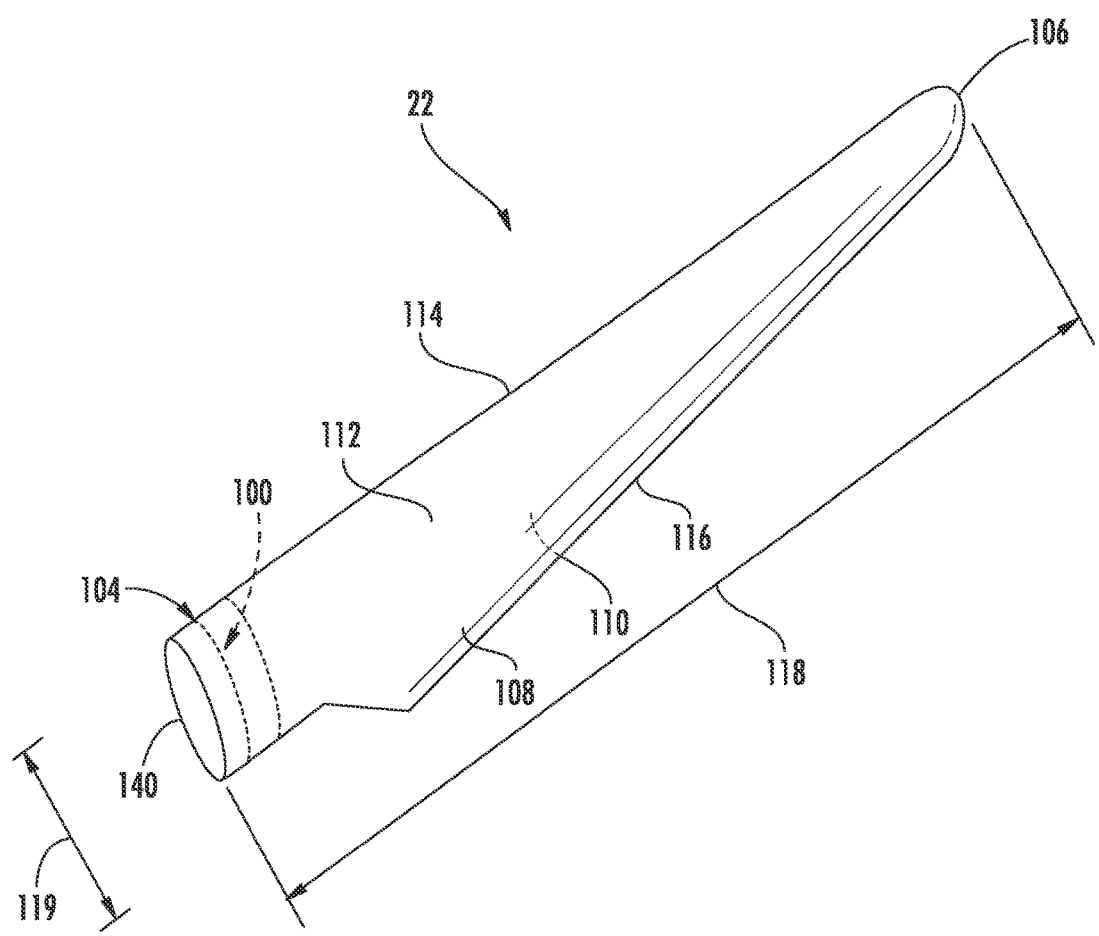
FIG. 2 illustrates a perspective view of one embodiment of a rotor blade of a wind turbine according to the present disclosure.

Referring now to FIG. 2, there is illustrated one embodiment of a rotor blade 22 in accordance with the present invention. As shown, the rotor blade 22 includes a shell 108 defining a pressure side 110 and a suction side 112 extending between a leading edge 114 and a trailing edge 116. The shell 108 may generally be configured to extend between a blade root section 104 and a blade tip 106 disposed opposite the blade root section 104 and may serve as the outer casing/covering of inner load bearing structure of the blade. Further, the rotor blade 22 may have a span 118 defining the total length between the blade root section 104 and the blade tip 106 and a chord 119 defining the total length between the leading and trailing edges 114, 116. As such, the chord 119 may vary along the span 118 of the rotor blade 22. Accordingly, the span-wise direction generally refers to the direction parallel to the span 118 of the rotor blade 22, whereas the chord-wise direction generally refers to the direction parallel to the chord 119 of the rotor blade 22. In addition, the blade root section 104 may have a generally cylindrical shape and may extend span-wise from the pressure side 110 and suction side 112 to an end face 140 of the root section 104. Further, the blade root section 104 may be configured to attach the rotor blade 22 to the hub 18 of the wind turbine 10 (FIG. 1). A rigid ring insert 100 (as indicated by the dotted lines) is disposed within the blade root section 104, and will be discussed in greater detail in regards to FIGS. 3-12.

Figure 3:
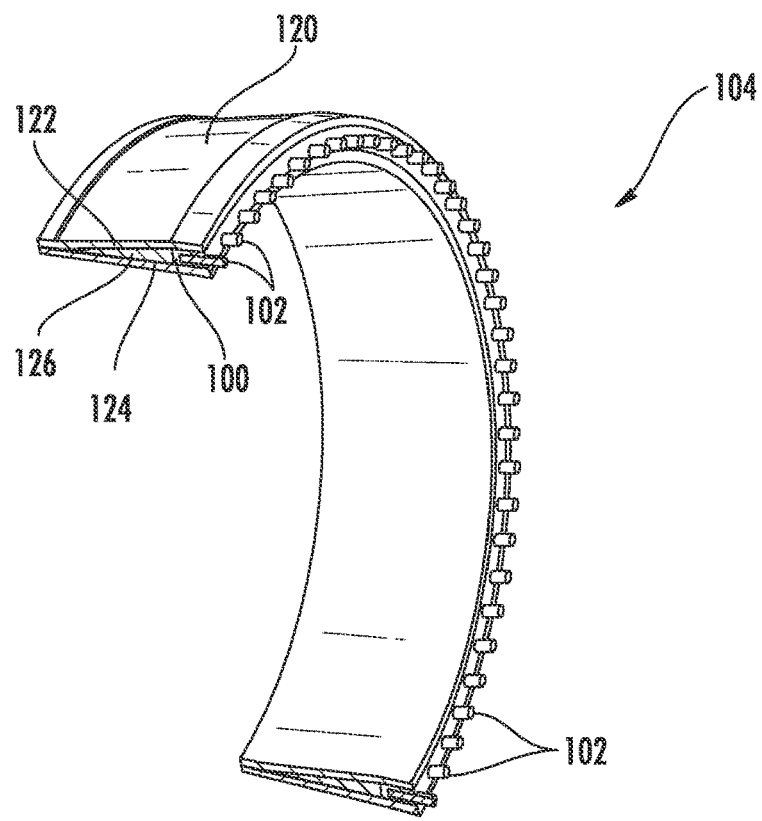
FIG. 3 illustrates a partial, enlarged view of a blade root section of the rotor blade of FIG. 2.
Figure 4:
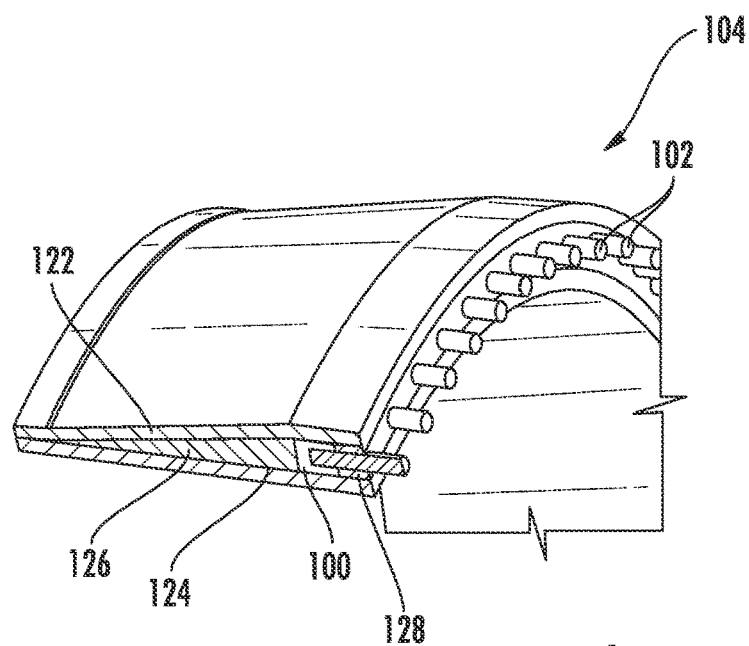
FIG. 4 illustrates an enlarged view of the blade root section of FIG. 3.
Figure 5:
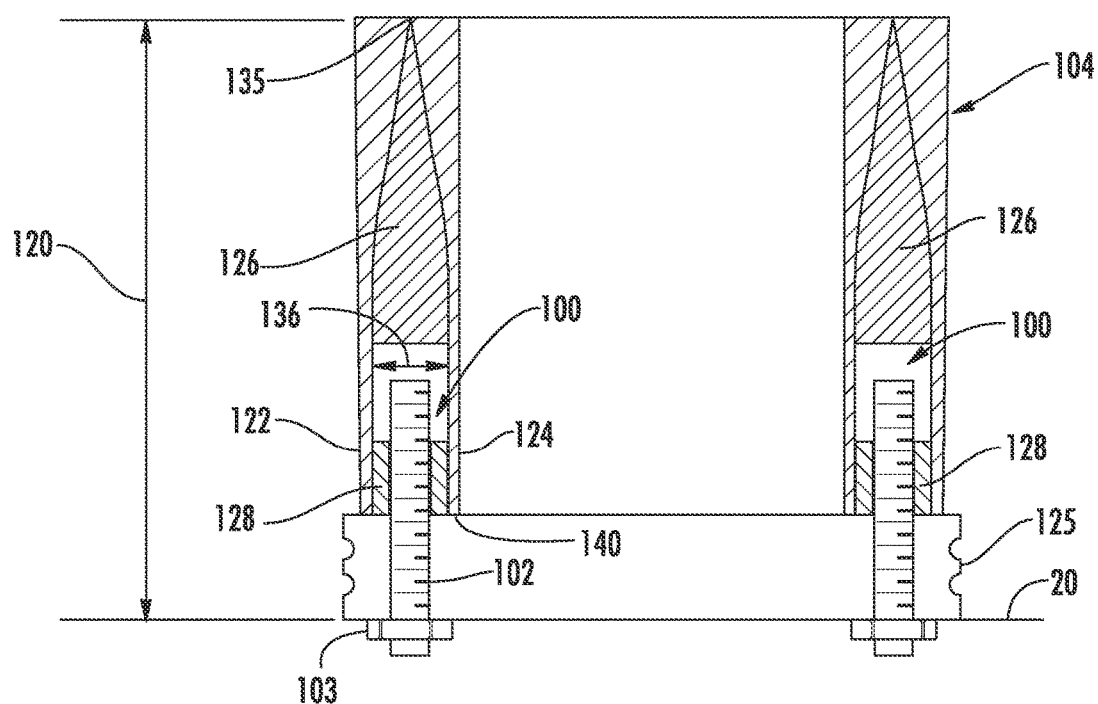
FIG. 5 illustrates a cross-sectional view of one embodiment of a blade root section of a rotor blade according to the present disclosure.

Referring particularly to FIGS. 3-5, various detailed views of the blade root section 104 of the rotor blade 22 of FIG. 2 are illustrated. As shown, the blade root section 104 includes a span-wise end portion 120 defined by an inner circumferential component 124 and an outer circumferential component 122. The term "circumferential component" is used herein to encompass any material configuration that defines the separate three-dimensional structures of the components 122, 124, such as separate laminates. Further, the inner 124 and outer 122 circumferential components are separated by a radial gap 136. A ring insert 100 is disposed in the radial gap 136 and embedded between the inner 124 and outer 122 circumferential components of the blade root section 104. As shown in FIG. 5, the blade root section 104 is configured to be connected to a hub 20 of the wind turbine 10 with a plurality of bolts 102 through a pitch bearing 125. More specifically, in certain embodiments, the end face 140 of the blade root section 104 may be connected to the pitch bearing 125 via the one or more blade bolts 102 with the pitch bearing 125 being configured operably between the rotor blade 22 and the hub 20.

Further, as shown generally in FIGS. 3-12, the ring insert 100 is a substantially circumferential component having a plurality of bolts holes 144 configured therein so as to provide a connecting means for the blade bolts 102. Thus, the ring insert 100 eliminates the need for multiple barrel nuts as required by many prior art blades. Accordingly, the ring insert 100 is configured to secure the blade root section 104 of the rotor blade 22 to the hub 20 of the wind turbine 10 via the blade bolts 102. In certain embodiments, the one or more bolt holes 144 of the ring insert 100, as well as the blade bolts 102, may be threaded. Thus, the threads of the blade bolts 102 may be threaded into the corresponding threads of the bolt holes 144 of the ring insert 100. In addition, the blade bolts 102 may be secured within the ring insert 100 via one or more attachment nuts 103. Further, the blade bolts 102 may be circumferentially spaced (equally or otherwise) around the ring insert 100 and connect the blade root section 104 to the pitch bearing 125 (FIG. 5).

Referring to FIGS. 3-6, the radial gap 136 of the blade root section 104 includes a first laminate material 126 embedded between the inner and outer circumferential components 122, 124 at a first span-wise depth 130 and a second laminate material 128 embedded between the inner and outer circumferential components 122, 124 at a second span-wise depth 132. Thus, the rigid ring insert 100 is disposed in the radial gap 136 and embedded between the first and second laminate materials 126, 128.

Figure 12:
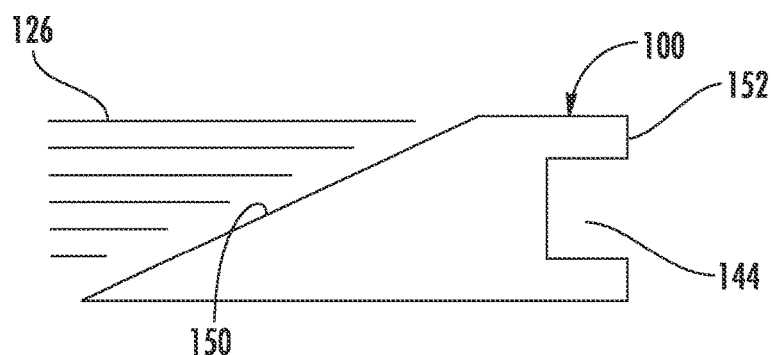
FIG. 12 illustrates a cross-sectional view of one embodiment of a rigid ring insert, particularly illustrating a ring insert having a tapering width according to the present disclosure.
Figure 13:
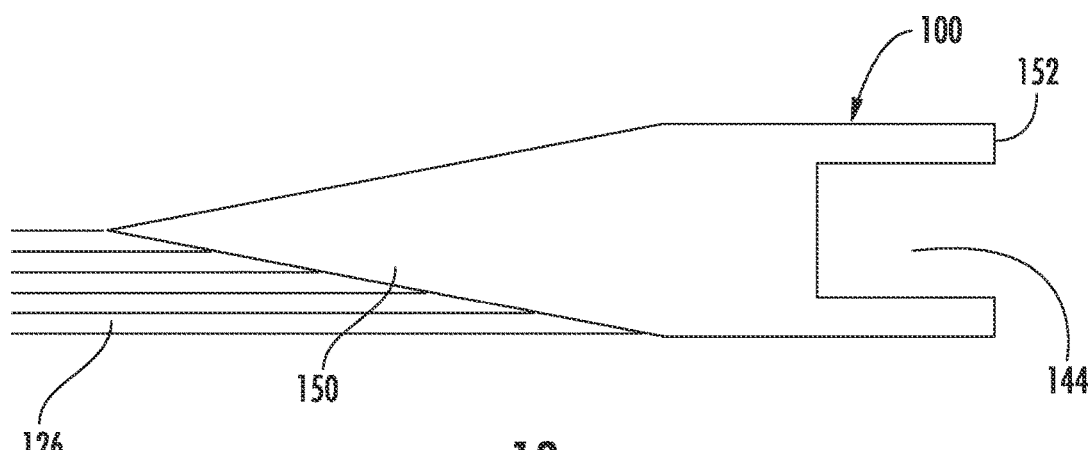
FIG. 13 illustrates a cross-sectional view of another embodiment of a rigid ring insert, particularly illustrating a ring insert having a tapering width according to the present disclosure.

The width of the radial gap 136 (and therefore the ring insert 100) may vary from the end face 140 of the blade root section 104 to an apex 135. For example, as illustrated in FIG. 5, the width of the radial gap 136 may gradually decrease from the end face 140 of the root section 104 to the apex 135. In additional embodiments, the width of the radial gap 136 may be consistent from end face 140 to the apex 135. Similarly, the ring insert 100 may have any suitable span-wise cross-sectional shape. For example, as shown in FIGS. 12 and 13, the ring insert 100 may have a tapered cross-sectional shape corresponding to the tapering radial gap 126 shape. In additional embodiments, the ring insert 100 may have any other suitable span-wise cross-sectional shape. For example, as shown in FIGS. 6, 9, and 10, the ring insert 100 has a substantially square or rectangular shape.

Figure 11:
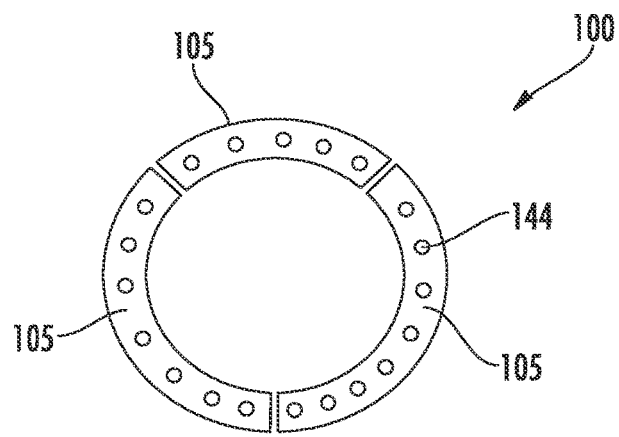
FIG. 11 illustrates a top view of one embodiment of a rigid ring insert, particularly illustrating a ring insert constructed of a plurality of ring segments according to the present disclosure.

It should be understood that the ring insert 100 of the present disclosure may be composed of a single segment of material as well as multiple segments connected together so as to provide a continuous ring insert. For example, the ring insert 100 may be composed of two segments, one on the pressure side 110 and one on the suction side 112 of the blade root section 104 as shown in FIG. 7. Alternatively, as shown in FIG. 11, the ring insert 100 includes three ring segments 105. In still further embodiments, the ring insert 100 may include any number of segments including more than three segments, such as four segments, five segments, six segments and so on. In addition, as shown in FIGS. 7 and 8, the plurality of segments 105 may be joined together using any suitable means. For example, in certain embodiments, the segments 105 may be joined together via one or more of the following: an interlocking joint, an interference fit, aligning features, adhesive, tape, one or more fasteners, or similar. More specifically, as shown, the ring insert 100 may include a first segment 107 and a second segment 109 joined together via a combination of aligning teeth 134 and an adhesive 138.

In addition, the ring insert 100 may include a varying cross-section configured to account for the varying edge-wise and/or flap-wise stiffness requirements or loads of the blade root section 104. More specifically, in certain embodiments having multiple ring segments 105, the chord-wise thickness of the segments 105 may vary from a first end to a second end of the segments. For example, as shown in FIG. 7, the chord-wise thickness of the first segment 107 may vary between a first end 111 and a second end 113 thereof. More specifically, as shown, the thickness at the first end 111 of the first segment 107 is equal to $T_1$, which decreases to $T_2$ near the half way point of the segment 107, and then increases back to $T_1$ at the second end 113. Thus, the thickness of the first segment 105 tapers between the first and second ends 111, 113. Similarly, the thickness at the first end 115 of the second segment 109 is equal to $T_1$, which decreases to $T_2$ near the half way point of the segment 109, and then increases back to $T_1$ at the second end 117.

Figure 9:
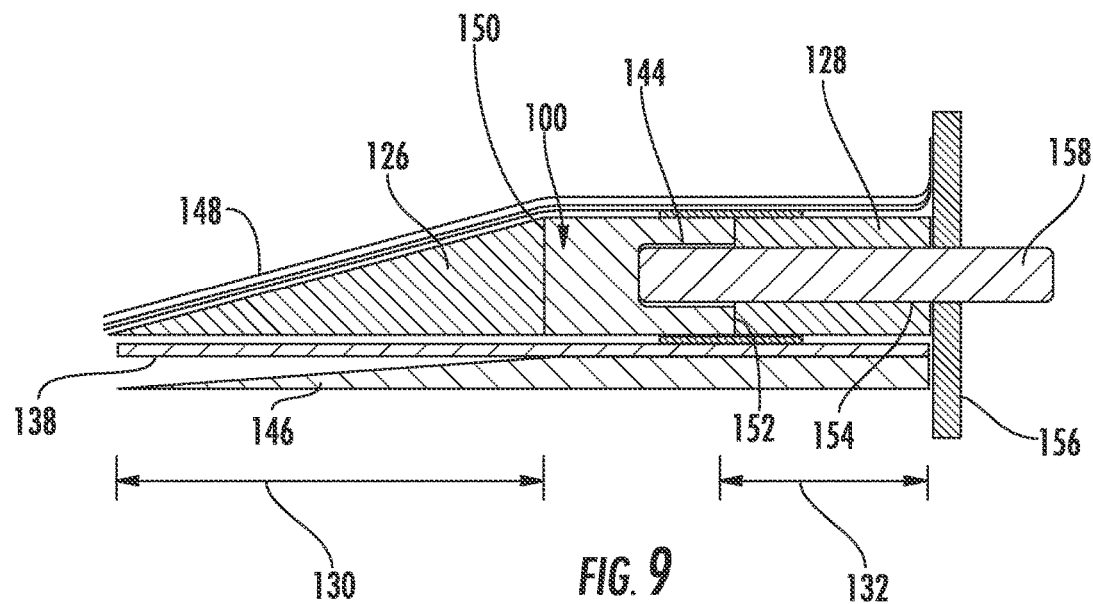
FIG. 9 illustrates a partial, cross-sectional view of another embodiment of a blade root section of a rotor blade during the manufacturing process, particularly illustrating a structural component forming a flat end face of the blade root section according to the present disclosure.
Figure 10:
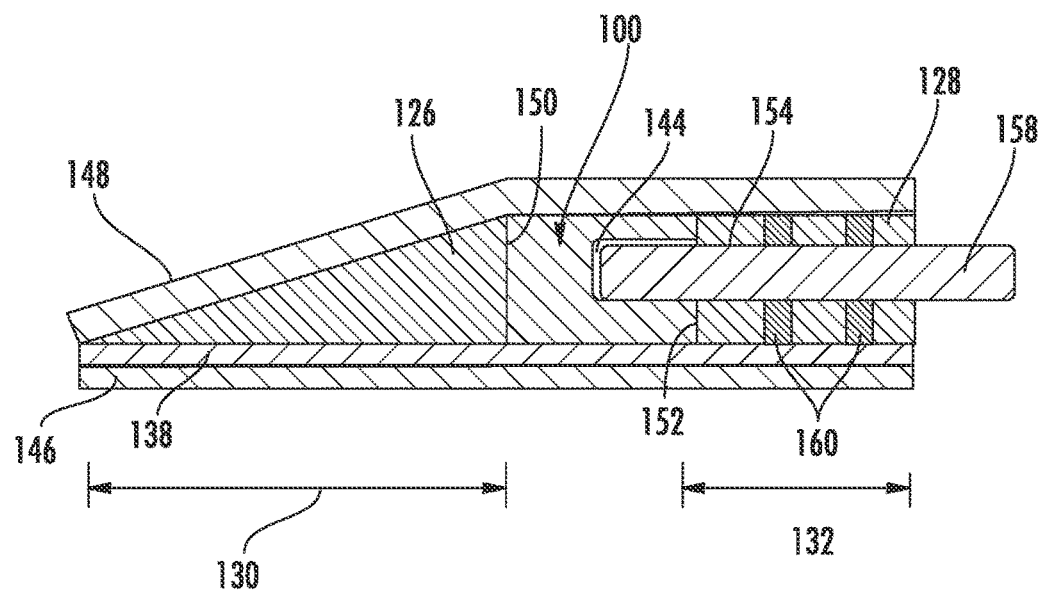
FIG. 10 illustrates a partial, cross-sectional view of yet another embodiment of a blade root section of a rotor blade during the manufacturing process, particularly illustrating a plurality of metal rings placed intermittently within the second composite material of the blade root section according to the present disclosure.

Referring generally to FIGS. 6, 9, and 10, the ring insert 100 (made of one segment or partitioned segments) may be further bonded to the inner 124 and outer 122 circumferential components (and between the first and second laminate materials 126, 128 by any suitable bonding agent or adhesive 138. The adhesive 138 may be applied to both the inner 124 and outer 122 circumferential components or any combination thereof. In still further embodiments, the blade root section 104 may also include a foam material, e.g. foam ring 142, configured adjacent to the ring insert 100 between the first and second laminate materials 126, 128.

In additional embodiments, the rigid ring insert 100 may be constructed of any suitable material configured to receive the blade bolts 102 and retain a certain bolt pre-loading. For example, in certain embodiments, the ring insert 100 may be constructed of a metal or metal alloy, such as steel, or similar or any combinations thereof. Additionally, the ring insert 100 may be a solid or hollow material.

Figure 14:
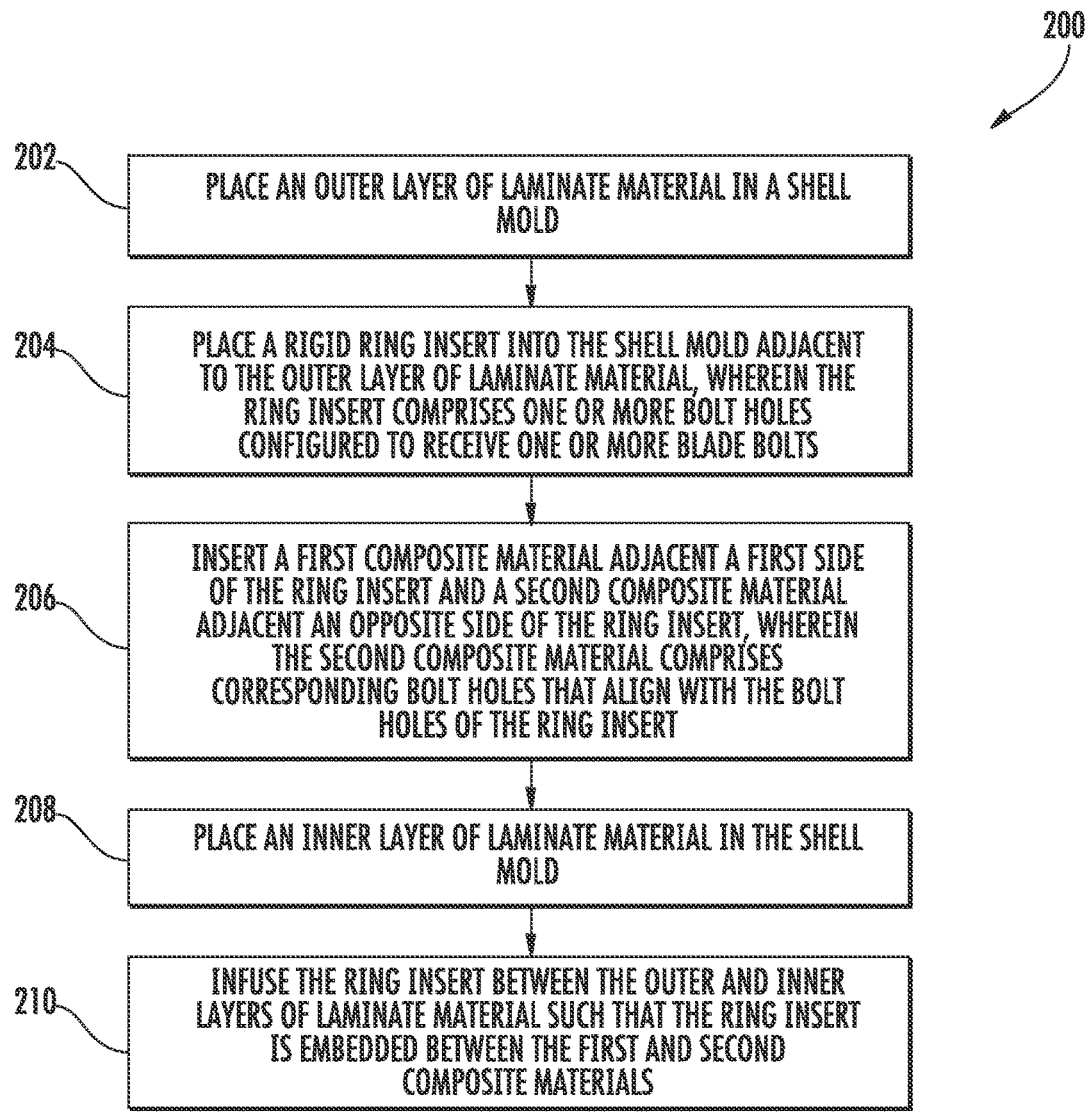
FIG. 14 illustrates a flow diagram of one embodiment of a method for manufacturing a blade root section having a rigid ring insert according to the present disclosure.

Referring now to FIG. 14, a flow diagram one of embodiment of a method for manufacturing a blade root section 104 of a rotor blade 22 of a wind turbine 10 according to one embodiment of the present disclosure is illustrated. In addition, FIGS. 6, 9, and 10 further illustrate various manufacturing steps according to the present disclosure. As shown at 202, the method 200 includes placing an outer layer 146 of laminate material in a shell mold. At 204, the method 200 includes placing a rigid ring insert 100 into the shell mold adjacent to the outer layer 146 of laminate material, wherein the ring insert 100 includes one or more bolt holes 144 configured to receive one or more blade bolts 102. At 206, the method 200 includes inserting a first composite material 126 adjacent a first side 150 of the ring insert 100 and a second composite material 128 adjacent an opposite side 152 of the ring insert 100. Further, as shown in FIGS. 6, 9, and 10, the second composite material 128 may include corresponding bolt holes 154 that align with the bolts holes 144 of the ring insert 100. In addition, as shown in FIG. 10, the second composite material 128 may include one or more metal rings 160 embedded therein to provide further stiffness to the blade root section 104. At 208, the method 200 includes placing an inner layer 148 of laminate material in the shell mold, e.g. atop the ring insert 100 that is sandwiched between the first and second laminate materials 126, 128. At 210, the method 200 includes infusing the ring insert 100 between the outer and inner layers 146, 148 of laminate material such that the ring insert 100 is embedded between the first and second composite materials 126, 128.

Referring particularly to FIGS. 6 and 9, the method 200 may also include positioning a structural component 156 adjacent to and substantially perpendicular to the second composite material 128, e.g. in the shell mold. In addition, the method 200 may also include placing the inner layer 148 of laminate material in the shell mold such that the inner layer 148 is secured to the structural component 156. In certain embodiments, the structural component 156 may include a metal plate configured to form a flat end face of the blade root section 104. Further, the structural component 156 may be configured to prevent resin from entering the shell mold during the manufacturing process.

In additional embodiments, as shown in FIGS. 6, 9, and 10, the method 200 also includes placing one or more bolt components 158 through the structural component 156 and into the aligned bolt holes 144, 154 of the ring insert 100 before infusing the ring insert 100 between the outer and inner layers 146, 148 of laminate material. Further, in certain embodiments, the structural component 156 may be used to position the one or more bolt components 158. Thus, the method 200 may also include removing the bolt component(s) 158 after infusing the ring insert 100 between the outer and inner layers 146, 148 of laminate material. As such, the bolt components 158 are configured to form bolt holes in the blade root section 104 during the manufacturing process that are configured to receive the blade bolts 102.

In yet another embodiment, as shown in FIGS. 6, 9, and 10, the method 200 may also include applying adhesive 138 between the outer layer 146 of laminate material and the ring insert 100. In addition, the method 200 may also include inserting a foam material, e.g. a foam ring 142, between the adhesive 138 and the ring insert 100. Thus, the foam ring 142 is configured to provide additional support and/or flexibility to the ring insert 100 when installed in the blade root section.

In further embodiments, the method 200 may also include placing a plurality of segments 105 of the ring insert 100 into the shell mold adjacent to the outer layer 146 of laminate material, and joining the plurality of segments 105 together via one or more of the following: an interlocking joint, an interference fit, aligning features, adhesive, tape, one or more fasteners, or similar. In addition, the method 200 may include placing a first segment 107 of the ring insert 100 and a second segment 109 of the ring insert 100 into the shell mold adjacent to the outer layer 146 of laminate material, wherein a thickness of the first segment 107 varies between a first end 111 to a second end 113 of the first segment 107 and a thickness of the second segment 109 varies between a first end 115 to a second end of the second segment 117.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
a rotor blade having a pressure side and a suction side, the pressure side and suction side extending between a leading edge and a trailing edge;
a cylindrical blade root section comprising an end face configured to attach the rotor blade assembly to a hub, the blade root section comprising a span-wise end portion defined by an inner circumferential component and an outer circumferential component, the inner and outer circumferential components separated by a radial gap, the radial gap comprising a first laminate material embedded between the inner and outer circumferential components at a first span-wise depth and a second laminate material embedded between the inner and outer circumferential components at a second span-wise depth;
one or more blade bolts for securing the blade root section to a hub of the wind turbine; and,
a rigid ring insert disposed in the radial gap and embedded between the first and second laminate materials, the ring insert further comprising one or more bolt holes configured to receive the one or more blade bolts, the one or more bolt holes extending from a first end of the ring insert and terminating before an opposing, second end of the ring insert, the ring insert comprising a first segment and a second segment, wherein a chord-wise thickness of each of the first and second segments tapers from a first thickness at a first terminal end to a lesser, second thickness at a midpoint of the first and second segments, respectively, and then increases back to the first thickness at an opposing second terminal end of the first and second segments, respectively.

2. The rotor blade assembly of claim 1, wherein the one or more bolt holes are threaded.

3. The rotor blade assembly of claim 1, wherein the end face of the blade root section is connectable to a pitch bearing via the one or more blade bolts, and wherein the pitch bearing is configured operably between the rotor blade assembly and the hub.

4. The rotor blade assembly of claim 1, wherein the ring insert further comprises a varying span-wise cross-section configured to account for varying edgewise and flapwise loads of the blade root section, the varying span-wise cross-section comprising a first cylindrical portion and a second tapered portion.

5. The rotor blade assembly of claim 1, wherein the first and second segments are joined together via one or more of the following: an interlocking joint, an interference fit, aligning features, adhesive, tape, or one or more fasteners.

6. The rotor blade assembly of claim 1, wherein the ring insert is constructed of at least one of the following: a metal or metal alloy.

7. The rotor blade assembly of claim 1, further comprising a foam ring configured adjacent to the ring insert between the first and second laminate materials.

8. The rotor blade assembly of claim 1, wherein the ring insert is further bonded between the first and second laminate materials via an adhesive.

9. A method for manufacturing a blade root section of a rotor blade of a wind turbine, the method comprising:
placing an outer layer of laminate material in a shell mold;
placing a rigid ring insert into the shell mold adjacent to the outer layer of laminate material, wherein the ring insert comprises a first segment and a second segment, wherein a chord-wise thickness of each of the first and second segments tapers from a first thickness at a first terminal end to a lesser, second thickness at a midpoint of the first and second segments, respectively, and then increases back to the first thickness at an opposing second terminal end of the first and second segments, respectively, the first and second segments of the ring insert further comprising one or more bolt holes configured to receive one or more blade bolts;
inserting a first composite material adjacent a first side of the ring insert and a second composite material adjacent an opposite side of the ring insert, wherein the second composite material comprises corresponding one or more bolt holes that align with the one or more bolt holes of the ring insert;

placing an inner layer of laminate material in the shell mold; and, infusing the ring insert between the outer and inner layers of laminate material such that the ring insert is embedded between the first and second composite materials.

10. The method of claim 9, further comprising:

positioning a structural component adjacent to and perpendicular to the second composite material; and placing the inner layer of laminate material in the shell mold such that the inner layer is secured to the structural component.

11. The method of claim 10, wherein the structural component comprises a metal plate configured to form a flat end face of the blade root section.

12. The method of claim 11, further comprising placing one or more bolt components through the metal plate and into the aligned one or more bolt holes of the ring insert before infusing the ring insert between the outer and inner layers of laminate material, and removing the one or more bolt components after infusing the ring insert between the outer and inner layers of laminate material, wherein the one or more bolt components are configured to form one or more bolt holes for the one or more blade bolts.

13. The method of claim 9, further comprising applying adhesive between the outer layer of laminate material and the ring insert.

14. The method of claim 13, further comprising inserting a foam ring between the adhesive and the ring insert.

15. The method of claim 9, further comprising:

placing the first and second segments of the ring insert into the shell mold adjacent to the outer layer of laminate material, and joining the first and second segments together via one or more of the following: an interlocking joint, an interference fit, aligning features, adhesive, tape, or one or more fasteners.

16. A wind turbine, comprising:

a tower;

a nacelle configured atop the tower; and a rotor coupled to the nacelle and comprising a rotatable hub and at least one rotor blade assembly, the rotor blade assembly comprising:

a rotor blade having a pressure side and a suction side extending between a leading edge and a trailing edge, a cylindrical blade root section comprising an end face configured to attach the rotor blade assembly to a hub, the blade root section comprising a span-wise end portion defined by an inner circumferential component and an outer circumferential component, the inner and outer circumferential components separated by a radial gap, the radial gap comprising a first laminate material embedded between the inner and outer circumferential components at a first span-wise depth and a second laminate material embedded between the inner and outer circumferential components at a second span-wise depth; and, a rigid ring insert disposed in the radial gap and embedded between the first and second laminate materials, the ring insert comprising a first segment and a second segment, wherein a chord-wise thickness of each of the first and second segments tapers from a first thickness at a first terminal end to a lesser, second thickness at a midpoint of the first and second segments, respectively, and then increases back to the first thickness at an opposing second terminal end of the first and second segments, respectively.

* * * * *